Sept. 18, 1951 A. SPACEK 2,568,132
PHASE MODULATED SIGNALING SYSTEM AND METHOD
Filed May 11, 1949
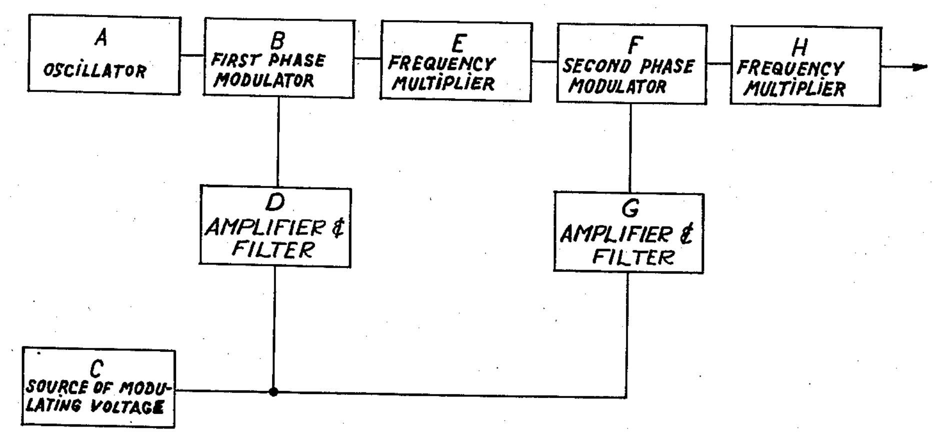
INVENTOR
Antonin Špaček
BY
Paul H. Smith Patented Sept. 18, 1951

2,568,132

UNITED STATES PATENT OFFICE 2,568,132

PHASE MODULATED SIGNALING SYSTEM AND METHOD

Antonín Špaček, Prague-Branik, Czechoslovakia, assignor of one-half to Tesla National Corporation, Prague, Czechoslovakia Application May 11, 1949, Serial No. 92,665
In Czechoslovakia May 21, 1948

4 Claims. (Cl. 332—22)

This invention relates to frequency modulation and, more particularly, to an improved method of signalling employing frequency modulations and an improved frequency modulated signalling system.

In present frequency modulated signalling systems it is difficult to obtain a stabilised center frequency of the frequency modulated oscillations. This disadvantage can be removed by the indirect method of frequency modulation, by means of phase modulation, the stability of the carrier frequency being secured by a stable (crystal) oscillator. Transformation from phase modulation to frequency modulation is carried out in the known way by means of a filter with inverse frequency response.

Phase modulation, however, supplies only a small frequency deviation $f$, particularly with low modulating frequencies. In the majority of cases, it is therefore necessary to increase the amount of deviation to get the required value. This is usually accomplished by means of frequency multipliers.

If a fundamental frequency $F_1$ is used which bears the same ratio to the required carrier frequency $F_0$ as the deviation $f_1$ obtainable by phase modulation bears to the required frequency deviation $f_0$, then the fundamental frequency $F_1$ is so low that it cannot be modulated by higher frequencies in a practical manner. For example, if the required carrier frequency $F_0$ is 100 mc. the required frequency deviation $f_0$ is 75 kc., and the obtainable frequency deviation $f_1$ is 12 kc., then the fundamental frequency $F_0$ would have to be 16 kc. to maintain such equal ratios. This frequency is practically so low that it cannot be modulated at all by higher modulating frequencies, e. g. 15 kc./s. If, on the other hand, a fundamental frequency is chosen of sufficiently high value that modulation with higher modulating frequencies is possible which, in practice, means at least five times the modulating frequency, i. e. 75 kc./s., then, after multiplying this fundamental frequency to the required value of the carrier frequency of 100 mc./s., only a small deviation would be obtained, e. g. approximately 16 kc./s. If sufficient multiplication were used to obtain the required value of the deviation, then the frequency of the carrier wave would be too high.

This difficulty is overcome essentially in two known ways. Either the modulated frequency is multiplied sufficiently to get the required deviation and the carrier frequency is reduced by the use of the mixing principle, or else frequency modulation is accomplished in several (usually at least six) consecutive steps giving a sufficiently high deviation. With this arrangement a higher fundamental frequency can be used, which can be modulated by the highest modulating frequency.

The present invention eliminates the necessity of using the mixing principle or of using a higher number of modulating steps and makes available a simplified method of obtaining frequency modulation.

With the foregoing in mind, an object of the invention is to obtain a relatively high frequency deviation by first modulating the carrier frequency by a portion of the low frequencies of the modulation frequency spectrum, subsequently multiplying the said frequency modulated carrier frequency, and then modulating the said multiplied frequency modulated carrier frequency by the higher portion of the modulation frequency spectrum.

Another object of the invention is to obtain the required frequency deviation by dividing the modulation frequency spectrum into two or several portions first frequency modulating the carrier wave by the portion containing the lowest modulation frequencies, then multiplying the modulated carrier wave and again frequency modulating the carrier wave by the portion of the modulation spectrum containing the higher modulation frequencies, with the number of modulation stages equalling the number of portions into which the modulation frequency spectrum has been divided.

Yet another object of the invention is to provide a method of obtaining frequency modulation without reducing the frequency of the carrier wave, through subsequent mixing with an auxiliary wave of constant frequency.

These, and other objects, advantages and novel features of the invention will be apparent from the following description and the accompanying drawing. In the drawing, the single figure is a schematic block diagram of a signalling system embodying the invention.

Referring to the drawing, the fundamental frequency $F_1$ is provided by a crystal stabilized oscillator A having a frequency output which bears the same ratio to the required carrier frequency $F_0$ as the ratio of the frequency deviation $F_1$ obtainable in a phase modulator B to the required frequency deviation $F_0$.

The modulator B is fed with an audio frequency modulation voltage from a source C—for example, a microphone amplifier—supplying the required modulation frequency spectrum voltage, through an amplifier D comprising a filter with an inverse frequency characteristic, for the purpose of transforming the phase modulation into frequency modulation. In addition, the frequency response of the amplifier D is arranged in such a way that it only amplifies the lower frequencies of the modulation spectrum supplied by the source C. If, for example, the frequency spectrum of the modulation frequencies, and hence also the frequency range to be passed, covers the range from 30 c./s. to 10 kc./s., the amplifier passes only frequencies from 30 c./s. to 1 kc./s.

The frequency of the main oscillator, frequency modulated by the lower portion of the spectrum, is now multiplied by the multiplier E, and again frequency modulated in the phase modulator F which is fed by the modulation signal through an amplifier comprising a filter G having an inverse frequency characteristic. The frequency response of the amplifier G is, however, such that only those frequencies of the modulation spectrum are amplified which come within the range between 1 kc./s. and 10 kc./s., in the illustrative example. Final amplification of the modulated output to the required value of the carrier frequency and frequency deviation is accomplished in the multiplier H.

In general, the properties of the amplifiers D and G are so chosen that, with modulating oscillations the frequency of which is lower than approximately one fifth of the frequency of the oscillator A, modulator B is active and with higher modulating frequencies only modulator F.

The reason for dividing the modulation spectrum into two portions and for separately modulating and multiplying the frequency of the main oscillator in several stages is to be seen in the fact that low modulation frequencies produce a low frequency deviation and require, therefore, a higher multiplication which is accomplished in the multiplier E, whereas modulation by higher frequencies, as long as their frequency is higher than about one fifth of the frequency of the oscillator A, must not reach the modulator B. By suitable choice of the complex amplifications of amplifiers D and G, it is always possible to achieve, with any required accuracy, that the frequency deviation is independent of the modulation frequency, or that the said deviation is dependent on the modulation frequency in a certain manner pre-emphasis.

While a specific embodiment of the invention has been shown and described in detail to illustrate the application principles, it should be understood that the invention may be otherwise embodied without departing from such principles.

I claim:

1. A frequency modulated signalling system comprising, in combination, a source of fundamental unmodulated frequency having a substantially constant frequency output; a source of modulation frequencies of a given frequency range; means operable to separate the modulation frequencies into frequency bands graded according to frequency magnitudes; means operable to modulate the fundamental frequency successively with modulation frequency bands of increasing frequency magnitude; and frequency multiplier means arranged to multiply the modulated fundamental frequency following each such modulation and in advance of the next succeeding modulation.

2. A frequency modulated signalling system comprising, in combination, a source of fundamental unmodulated frequency having a substantially constant frequency output; a source of modulation frequencies of a given frequency range; means, comprising amplifying means and associated filter means with inverse frequency characteristics, operable to separate the modulation frequencies into frequency bands graded according to frequency magnitudes and to frequency modulate the fundamental frequency successively with modulation frequency bands of increasing frequency magnitude; and frequency multiplier means arranged to multiply the modulated fundamental frequency following each such modulation and in advance of the next succeeding modulation.

3. A frequency modulated signalling system comprising, in combination, a source of fundamental frequency having a substantially constant frequency output; a source of modulation frequencies of a given frequency range; a number of amplifier filter combinations, having inverse frequency characteristics, connected to the output of said source of modulation frequencies and operable to separate the modulation frequencies into frequency bands graded according to frequency magnitudes, a number of modulators equal to the number of said combinations and each connected to the output of a different combination; a number of frequency multipliers each connected between the output of one modulator and the input of a succeeding modulator; means operable to apply the fundamental frequency to the input of the initial modulator; each succeeding modulator frequency modulating the fundamental frequency with a modulation frequency band of a progressively increased frequency magnitude; and at least one frequency multiplier connected to the output of the last modulator.

4. A method of frequency modulated signalling comprising generating an unmodulated fundamental frequency having a substantially constant frequency output; introducing modulation frequencies of a given frequency range; separating the modulating frequencies into frequency bands graded according to frequency magnitudes; modulating the fundamental frequency successively with modulation frequency bands of increasing frequency magnitude; and multiplying the modulated fundamental frequency following each such modulation and in advance of the next succeeding modulation.

ANTONÍN ŠPAČEK.

REFERENCES CITED

The following references are of record in the file of this patent:

UNITED STATES PATENTS

| Number | Name | Date |
|---|---|---|
| 2,335,934 | Goldstine | Dec. 7, 1943 |
| 2,405,765 | Smith | Aug. 13, 1946 |
| 2,407,212 | Tunick | Sept. 3, 1946 |
| 2,436,834 | Stodola | Mar. 2, 1948 |
| 2,473,318 | Weighton | June 14, 1949 |